US006466947B2

(12) United States Patent
Arnold et al.

(10) Patent No.: US 6,466,947 B2
(45) Date of Patent: Oct. 15, 2002

(54) APPARATUS AND METHOD FOR DYNAMICALLY VERIFYING INFORMATION IN A DISTRIBUTED SYSTEM

(75) Inventors: Kenneth C. R. C. Arnold, Lexington; Ann M. Wollrath, Groton; James H. Waldo, Dracut, all of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/044,932

(22) Filed: Mar. 20, 1998

(65) Prior Publication Data

US 2002/0016790 A1 Feb. 7, 2002

(51) Int. Cl.[7] .............................................. G06F 17/00
(52) U.S. Cl. ............................ 707/104; 707/9; 707/10; 707/102; 707/201; 380/4; 709/306; 711/170
(58) Field of Search .......................... 380/4; 235/379; 707/201, 206, 9, 10, 102, 104; 711/170; 705/35; 709/306

(56) References Cited

U.S. PATENT DOCUMENTS

| 4,430,699 A | 2/1984 | Segarra et al. ............... 709/230 |
| 4,491,946 A | 1/1985 | Kryskow, Jr. et al. ...... 370/453 |
| 4,558,413 A | 12/1985 | Schmidt et al. ............. 707/203 |
| 4,713,806 A | 12/1987 | Oberlander et al. ......... 370/358 |
| 4,809,160 A | 2/1989 | Mahon et al. ........... 364/231.8 |

(List continued on next page.)

FOREIGN PATENT DOCUMENTS

| EP | 0 300 516 A | 1/1989 |
| EP | 0 351 536 A3 | 1/1990 |
| EP | 0 384 339 A | 2/1990 |
| EP | 0 472 874 A1 | 3/1992 |
| EP | 0 474 340 A | 3/1992 |
| EP | 497 022 A1 | 8/1992 |
| EP | 0 555 997 A | 8/1993 |
| EP | 0 565 849 A | 10/1993 |
| EP | 0 569 195 A2 | 11/1993 |
| EP | 0 625 750 A | 11/1994 |

(List continued on next page.)

OTHER PUBLICATIONS

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Burns et al., "An Analytical Study of Opportunistic Lease Renewal," Distributed Computing Systems, 21st International Conference, pp. 146–153, Apr. 2000.

Dollimore et al., "The Design of a System for Distributing Shared Objects," The Computer Journal, No. 6, Cambridge, GB, Dec. 1991.

(List continued on next page.)

Primary Examiner—Charles L. Rones
Assistant Examiner—Thuy Pardo
(74) Attorney, Agent, or Firm—Finnegan, Henderson, Farabow, Garrett & Dunner, LLP

(57) ABSTRACT

Use of a policy object for verification in a distributed system. A machine downloads a policy object containing a reference to code governing verification of data. The machine uses the reference to obtain the code and locally verify data or other information. As particular rules for the data change, the policy object may be updated to provide a reference to the code for the new rules when it is downloaded.

30 Claims, 7 Drawing Sheets

U.S. PATENT DOCUMENTS

| | | | |
|---|---|---|---|
| 4,823,122 A | 4/1989 | Mann et al. | 340/825.28 |
| 4,939,638 A | 7/1990 | Stephenson et al. | 710/244 |
| 4,956,773 A | 9/1990 | Saito et al. | 395/703 |
| 5,088,036 A | 2/1992 | Ellis et al. | 395/425 |
| 5,109,486 A | 4/1992 | Seymour | 395/237.3 |
| 5,187,787 A | 2/1993 | Skeen et al. | 395/600 |
| 5,218,699 A | 6/1993 | Brandle et al. | 709/304 |
| 5,257,369 A | 10/1993 | Skeen et al. | 395/650 |
| 5,293,614 A | 3/1994 | Ferguson et al. | 395/600 |
| 5,297,283 A | 3/1994 | Kelly et al. | 709/104 |
| 5,307,490 A | 4/1994 | Davidson et al. | |
| 5,311,591 A | 5/1994 | Fischer | 380/4 |
| 5,339,435 A | 8/1994 | Lubkin et al. | 395/712 |
| 5,386,568 A | 1/1995 | Wold et al. | 395/710 |
| 5,390,328 A | 2/1995 | Frey et al. | 709/303 |
| 5,392,280 A | 2/1995 | Zheng | 370/353 |
| 5,423,042 A | 6/1995 | Jalili et al. | 709/328 |
| 5,440,744 A | 8/1995 | Jacobson et al. | 709/203 |
| 5,448,740 A | 9/1995 | Kiri et al. | 395/708 |
| 5,452,459 A | 9/1995 | Drury et al. | |
| 5,455,952 A | 10/1995 | Gjovaag | 395/701 |
| 5,471,629 A | 11/1995 | Risch | 707/201 |
| 5,475,792 A | 12/1995 | Stanford et al. | 704/233 |
| 5,475,817 A | 12/1995 | Waldo et al. | 709/303 |
| 5,481,721 A | 1/1996 | Serlet et al. | 709/303 |
| 5,504,921 A | 4/1996 | Dev et al. | 709/223 |
| 5,511,197 A | 4/1996 | Hill et al. | 709/303 |
| 5,524,244 A | 6/1996 | Robinson et al. | 395/705 |
| 5,548,726 A | 8/1996 | Pettus | |
| 5,553,282 A | 9/1996 | Parrish et al. | 707/10 |
| 5,555,367 A | 9/1996 | Premerlani et al. | 707/4 |
| 5,555,427 A | 9/1996 | Aoe et al. | |
| 5,557,798 A | 9/1996 | Skeen et al. | 395/650 |
| 5,560,003 A | 9/1996 | Nilsen et al. | 395/600 |
| 5,561,785 A | 10/1996 | Blandy et al. | 395/497.01 |
| 5,577,231 A | 11/1996 | Scaizi et al. | 395/500.47 |
| 5,594,921 A | 1/1997 | Pettus | |
| 5,603,031 A | 2/1997 | White et al. | 395/683 |
| 5,617,537 A | 4/1997 | Yamada et al. | 395/121 |
| 5,628,005 A | 5/1997 | Hurvig | 707/8 |
| 5,640,564 A | 6/1997 | Hamilton et al. | 709/303 |
| 5,644,768 A | 7/1997 | Periwal et al. | |
| 5,652,888 A | 7/1997 | Burgess | 709/303 |
| 5,655,148 A | 8/1997 | Richman et al. | 395/828 |
| 5,659,751 A | 8/1997 | Heninger | 395/685 |
| 5,671,225 A | 9/1997 | Hooper et al. | 370/468 |
| 5,675,796 A | 10/1997 | Hodges et al. | 709/100 |
| 5,675,797 A | 10/1997 | Chung et al. | 709/104 |
| 5,680,573 A | 10/1997 | Rubin et al. | 711/129 |
| 5,680,617 A | 10/1997 | Gough et al. | 707/104 |
| 5,684,955 A | 11/1997 | Meyer et al. | 709/303 |
| 5,689,709 A | 11/1997 | Corbett et al. | 709/303 |
| 5,706,435 A | 1/1998 | Barbara | 711/141 |
| 5,706,502 A * | 1/1998 | Foley et al. | 707/10 |
| 5,724,588 A | 3/1998 | Hill et al. | 709/304 |
| 5,727,145 A | 3/1998 | Nessett et al. | 713/200 |
| 5,737,607 A | 4/1998 | Hamilton et al. | 395/701 |
| 5,745,678 A | 4/1998 | Herzberg et al. | 713/200 |
| 5,745,695 A | 4/1998 | Gilchrist et al. | 709/227 |
| 5,745,703 A | 4/1998 | Cetjin et al. | 709/303 |
| 5,745,755 A | 4/1998 | Covey | |
| 5,748,897 A | 5/1998 | Katiyar | |
| 5,754,849 A | 5/1998 | Dyer et al. | 707/101 |
| 5,757,925 A | 5/1998 | Faybishenko | 380/49 |
| 5,758,344 A * | 5/1998 | Prassad et al. | 707/10 |
| 5,761,656 A | 6/1998 | Ben-Schachar | 707/4 |
| 5,764,897 A | 6/1998 | Khalidi | 709/201 |
| 5,768,532 A | 6/1998 | Megerian | 709/245 |
| 5,774,551 A | 6/1998 | Wu et al. | 380/25 |
| 5,778,187 A | 7/1998 | Monteiro et al. | |
| 5,778,228 A | 7/1998 | Wei | 709/304 |
| 5,778,368 A | 7/1998 | Hogan et al. | 707/10 |
| 5,784,560 A * | 7/1998 | Kingdon et al. | 395/200.31 |
| 5,787,425 A | 7/1998 | Bigus | 707/6 |
| 5,787,431 A | 7/1998 | Shaughnessy | 707/10 |
| 5,790,548 A | 8/1998 | Sistanizadeh et al. | |
| 5,802,367 A | 9/1998 | Held et al. | |
| 5,808,911 A | 9/1998 | Tucker et al. | |
| 5,809,507 A | 9/1998 | Cavanaugh, III | 707/103 |
| 5,812,819 A | 9/1998 | Rodwin et al. | |
| 5,813,013 A | 9/1998 | Shakib et al. | 707/102 |
| 5,815,149 A | 9/1998 | Mutschler, III et al. | 345/335 |
| 5,815,709 A | 9/1998 | Waldo et al. | 709/303 |
| 5,815,711 A | 9/1998 | Sakamoto et al. | 395/701 |
| 5,818,448 A | 10/1998 | Katiyar | |
| 5,829,022 A | 10/1998 | Watanabe et al. | 711/118 |
| 5,832,219 A | 11/1998 | Pettus | |
| 5,832,529 A | 11/1998 | Wollrath et al. | 707/206 |
| 5,832,593 A | 11/1998 | Malik et al. | 395/750 |
| 5,835,737 A | 11/1998 | Sand et al. | 710/113 |
| 5,842,018 A | 11/1998 | Atkinson et al. | 707/501 |
| 5,844,553 A | 12/1998 | Hao et al. | 345/329 |
| 5,845,090 A | 12/1998 | Collins, III et al. | 709/221 |
| 5,845,129 A | 12/1998 | Wendorf et al. | 710/200 |
| 5,860,004 A | 1/1999 | Fowlow et al. | 395/701 |
| 5,860,153 A | 1/1999 | Matena et al. | 711/216 |
| 5,864,862 A | 1/1999 | Kriens et al. | 711/216 |
| 5,864,866 A | 1/1999 | Henckel et al. | 707/103 |
| 5,872,928 A | 2/1999 | Lewis et al. | 709/222 |
| 5,872,973 A | 2/1999 | Mitchell et al. | |
| 5,875,335 A | 2/1999 | Beard | 395/705 |
| 5,878,411 A | 3/1999 | Borroughs et al. | 707/4 |
| 5,884,024 A | 3/1999 | Lim et al. | |
| 5,884,079 A | 3/1999 | Furusawa | 395/701 |
| 5,887,134 A | 3/1999 | Ebrahim | 709/200 |
| 5,889,951 A | 3/1999 | Lombardi | |
| 5,890,158 A | 3/1999 | House et al. | 707/10 |
| 5,892,904 A | 4/1999 | Atkinson et al. | 713/201 |
| 5,933,497 A * | 8/1999 | Beetcher et al. | 380/4 |
| 5,933,647 A | 8/1999 | Aronberg et al. | 717/178 |
| 5,935,249 A | 8/1999 | Stern et al. | 713/201 |
| 5,940,827 A | 8/1999 | Hapner et al. | 707/8 |
| 5,944,793 A | 8/1999 | Islam et al. | 709/220 |
| 5,946,485 A | 8/1999 | Weeren et al. | 395/703 |
| 5,946,694 A | 8/1999 | Copeland et al. | 707/103 |
| 5,951,652 A | 9/1999 | Ingrassia, Jr. et al. | 709/248 |
| 5,956,509 A | 9/1999 | Kevner | 709/330 |
| 5,969,967 A | 10/1999 | Aahlad et al. | 700/2 |
| 5,974,201 A | 10/1999 | Chang et al. | 382/305 |
| 5,978,484 A * | 11/1999 | Apperson et al. | 380/25 |
| 5,987,506 A | 11/1999 | Carter et al. | 709/213 |
| 5,999,179 A | 12/1999 | Kekic et al. | 345/734 |
| 5,999,988 A | 12/1999 | Pelegri-Llopart et al. | 709/330 |
| 6,003,763 A * | 12/1999 | Gallagher et al. | 235/379 |
| 6,009,103 A | 12/1999 | Woundy | 370/401 |
| 6,016,496 A | 1/2000 | Roberson | 707/103 |
| 6,023,586 A * | 2/2000 | Gaisford et al. | 395/712 |
| 6,026,414 A | 2/2000 | Anglin | 707/204 |
| 6,031,977 A | 2/2000 | Pettus | 709/230 |
| 6,052,761 A | 4/2000 | Hornung et al. | 711/141 |
| 6,058,383 A * | 5/2000 | Narasimhalu et al. | 705/44 |
| 6,061,699 A | 5/2000 | DiCecco et al. | 707/513 |
| 6,061,713 A | 5/2000 | Bharadhwaj | 709/203 |
| 6,067,575 A * | 5/2000 | McManis et al. | 709/300 |
| 6,085,255 A | 7/2000 | Vincent et al. | 709/238 |
| 6,108,346 A | 8/2000 | Doucette et al. | 370/450 |
| 6,185,602 B1 | 2/2001 | Bayrakeri | 709/204 |
| 6,185,611 B1 | 2/2001 | Waldo et al. | 709/221 |
| 6,226,746 B1 | 5/2001 | Scheifler | 713/200 |
| 6,247,091 B1 | 6/2001 | Lovett | 710/260 |
| 6,263,379 B1 | 7/2001 | Atkinson et al. | 709/332 |

| | | | | |
|---|---|---|---|---|
| 6,282,295 B1 | * | 8/2001 | Young et al. | 380/286 |
| 6,282,568 B1 | | 8/2001 | Sondur et al. | 709/223 |

FOREIGN PATENT DOCUMENTS

| | | |
|---|---|---|
| EP | 0 635 792 A | 1/1995 |
| EP | 0 651 328 A | 5/1995 |
| EP | 0 660 231 A | 6/1995 |
| EP | 0 718 761 A | 12/1995 |
| EP | 0 697 655 A2 | 2/1996 |
| EP | 0 767 432 A2 | 4/1997 |
| EP | 0 810 524 A | 5/1997 |
| EP | 0 778 520 A2 | 6/1997 |
| EP | 0 794 493 A2 | 9/1997 |
| EP | 0 803 810 A2 | 10/1997 |
| EP | 0 803 811 A | 10/1997 |
| EP | 0 805 393 A2 | 11/1997 |
| EP | 0 817 020 A | 1/1998 |
| EP | 0 817 022 A2 | 1/1998 |
| EP | 0 817 025 A | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO92/07335 | 4/1992 |
| WO | WO92/09948 | 6/1992 |
| WO | WO93/25962 A1 | 12/1993 |
| WO | WO94/03855 A | 2/1994 |
| WO | WO 96/10787 | 4/1996 |
| WO | WO96/18947 A | 6/1996 |
| WO | WO96/24099 A | 8/1996 |
| WO | WO98/02814 | 1/1998 |
| WO | WO98/04971 | 2/1998 |
| WO | WO96/03692 A | 2/1999 |

OTHER PUBLICATIONS

Fleisch et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Guyennet et al., "A New Consistency Protocol Implemented in the CAliF System," IEEE, 1094–7256/97, pp. 82–87, 1997.

Guyennet et al., "Distributed Share Memory Layer for Cooperative Work Applications," IEEE, 0742–1303/97, pp. 72–78, 1997.

Hoshi et al., "Allocation of the Cross–Connect Function in Leased Circuit Networks," 1992, ICC'92, conference record, SUPERCOMM/ICC '02, D a New World of Communications, IEEE International Conference, pp. 1408–1412.

IBM Technical Disclosure Bulletin, "Local Network Monitoring to Populate Access Agent Directory," vol. 36, No. 09A, pp. 403–405, Sep. 1993.

McGrath, "Discovery and Its Discontents: Discovery Protocols for Ubiquitous Computing," Presented at Center for Excellence in Space Data and Information Science, NASA Goddard Space Flight Center, Apr. 5, 2000.

MUX–Elektronik, Java 1.1 Interactive Course, www.lls.se/~mux/javaic.html, 1995.

Stevenson, "Token–Based Consistency of Replicated Servers," IEEE, CH2686–4/89/0000/0179, pp. 179–183, 1989.

Yin et al., "Volume Leases for Consistency in Large–Scale Systems," IEEE Transactions on Knowledge & Data Engineering, vol. 11, No. 4, pp. 563–576, Jul./Aug. 1999.

Hodges, Douglas, "Managing Object Lifetimes in OLE," Aug. 25, 1994, pp. 1–41.

Mullender, *Distributed Systems,* Second Edition, Addison–Wesley, 1993.

Howard et al., Scale and Performance in a Distributed File System, ACM Transactions on Computer Systems, vol. 6, No. 1, Feb. 1988, pp. 51–81.

Cardelli, *Obliq. A lightweight language for network objects,* Nov. 5, 1993, pp. 1–37.

Dijkstra, Self–stabilizing Systems in Spite of Distributed Control, Communications of the ACM, vol. 17, No. 11, Nov. 1974, pp. 643–644.

Ousterhout et al., The Sprite Network Operating System, Computer, IEEE, Feb. 1988, pp. 23–36.

Dourish, A Divergence–Based Model of Synchrony and Distribution in Collaborative Systems, Xerox Technical Report EPC–1194–102, 1994, pp. 1–10.

Sharrott et al., *ObjectMap: Integrating High Performance Resources into a Distributed Object–oriented Environment,* ICODP, 1995.

Birrell et al., Grapevine: An Exercise in Distributed Computing, Communications of the ACM, vol. 25, No. 4, Apr. 1982, pp. 260–274.

*Transparent Network Computing,* Locus Computing Corporation, Jan. 5, 1995.

Gray et al., Leases: An Efficient Fault–Tolerant Mechanism for Distributed File Cache Consistency, ACM, 1989, pp. 202–210.

Lamport et al., The Byzantine Generals Problem, ACM Transactions on Programming Languages and Systems, vol. 4, No. 3, Jul. 1982, pp. 382–401.

Dolev et al., On the Minimal Synchronism Needed for Distributed Consensus, Journal of the ACM, vol. 34, No. 1, Jan. 1987, pp. 77–97.

Mummert et al., *Long Term Distributed File Reference Tracing: Implementation and Experience,* Carnegie Mellon University School of Computer Science, Nov. 1994, pp. 1–28.

Gelernter et al., *Parallel Programming in Linda,* Yale University, Jan. 1985, pp. 1–21.

Cannon et al., Adding Fault–Tolerant Transaction Processing to LINDA, Software–Practice and Experience, vol. 24(5), May 1994, pp. 449–466.

Kambhatla et al., Recovery with Limited Replay: Fault–Tolerant Processes in Linda, Oregon Graduate Institute, Technical Report CSIE 90–019, Sep. 1990, pp. 1–16.

Anderson et al., Persistent Linda: Linda + Transactions + Query Processing, Proceedings of the 13th Symposium on Fault Tolerant Systems, 1994, pp. 93–109.

Gelernter, Generative Communication in Linda, ACM Transactions on Programming Languages and Systems, vol. 7, No. 1, Jan. 1985, pp. 80–112.

Carriero et al., Distributed Data Structures in Linda, Principals of Programming Language, 1986, pp. 1–16.

Pinakis, *Using Linda as the Basis of an Operating System Microkernel,* University of Western Australia, Department of Computer Sciences, Aug. 1993, pp. 1–165.

LINDA Database Search, Jul. 20, 1995, pp. 1–68.

Carriero et al, *Distributed Data Structures in Linda,* Yale Research Report YALEU/DCS/RR–438, Nov. 1985.

Agha et al., *Actorspaces: An Open Distributed Programming Paradigm,* University of Illinois, Report No. UTUCDCS–R–92–1766, Open Systems Laboratory TR No. 8, Nov. 1992, pp. 1–12.

Ahmed et al., *A Program Building Tool for Parallel Applications,* Yale University, Dec. 1, 1993, pp. 1–23.

Liskov et al., Distributed Object Management in Thor, International Workshop on Distributed Object Management, 1992, pp. 12.

Coulouris et al., *Distributed Systems Concepts and Designs,* Second Edition, Addison–Wesley, 1994.

Birrell et al., *Network Objects,* DEC SRC Research Report 115, Feb. 28, 1994.

Birrell et al., Distributed Garbage Collection for Network Objects, DEC SRC Research Report 116, Dec. 15, 1993.

Jaworski, *Java 1.1 Developer's Guide,* Sams.net, 1997.

Wollrath et al., A Distributed Object Model for the Java™ System, USENIX Association, Conference on Object–Oriented Technologies and Systems, Jun. 17–21, 1996.

Harris et al., *Proposal for a General Java Proxy Class for Distributed Systems and Other Uses,* Netscape Communications Corp., Jun. 25, 1997.

Hamilton, Java and the Shift to Net–Centric Computing Computer, Aug. 1996, pp. 31–39.

Chung et al., A 'Tiny' Pascal Compiler: Part 1: The P–Code Interpreter, BYTE Publications, Inc., Sep. 1978.

Chung et al., A 'Tiny' Pascal Compiler: Part 2: The P–Compiler, BYTE Publications, Inc., Oct. 1978.

Thompson, Regular Expression Search Algorithm, Communications of the ACM, vol. II, No. 6, p. 149 et seq., Jun. 1968.

Mitchell et al., *Mesa Language Manual,* Xerox Corporation.

McDaniel, *An Analysis of a Mesa Instruction Set,* Xerox Corporation, May 1982.

Pier, *A Retrospective on the Dorado, A High–Performance Personal Computer,* Xerox Corporation, Aug. 1983.

Pier, A Retrospective on the Dorado, A High–Performance Personal Computer, IEEE Conference Proceedings, The 10th Annual international Symposium on Computer Architecture, 1983.

Krasner, The Smalltalk–80 Virtual Machine, BYTE Publications Inc., Aug. 1991, pp. 300–320.

*Operating Systems Review,* ACM Press, vol. 27, No. 5, Dec. 1993, pp. 217–230.

*Remote Method Invocation Specification,* Sun Microsystems, Inc., (1997), http://java.sun.com/products/jdk/1.1/docs/guide/rmi/spec/rmiTOC.doc.html.

Birrell et al., Implementing Remote Procedure Calls, ACM Transactions on Computer Systems, vol. 2, No. 1, Feb. 1984, pp. 39–59.

Alexander, et al., "Active Bridging", Proceedings of the ACM/SIGCOMM'97 Conference, Cannes, France, Sep. 1997.

Anonymous: "Change–Notification Service for Shared Files" IBM Technical Disclosure Bulletin, vol. 36, No. 8, pp. 77–82, XP002108713 New York, US.

Anonymous: "Resource Preemption for Priority Scheduling." Nov. 1973. IBM Technical Disclosure Bulletin, vol. 16, No. 6, p. 1931 XP002109435 New York, US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–Oriented Database Management Systems: Concepts and Issues," Computer, vol. 24, No. 4, pp. 33–47, (Apr. 1991), Los Alamitos, CA.

Betz, Mark; "Interoperable objects: laying the foundation for distributed object computing"; Dr. Dobb's Journal, vol. 19, No. 11, p. 18(13); (Oct. 1994).

Bevan, D.I., "An Efficient Reference Counting Solution To The Distributed Garbage Collection Problem", Parall Computing, NL, Elsevier Publishers, Amsterdam, vol. 9, No. 2, pp. 179–192.

Birrell et al., "Implementing Remote Procedure Calls", ACM Transactions on Computer Systems, vol. 2, No. 1, Feb. 1984, pp. 39–59.

Dave A et al: "Proxies, Application Interface, and Distributed Systems", Proceedings International Workshop on Object Orientation in Operating Systems, Sep. 24, 1992, pp. 212–220.

Deux O et al: "The O2 System" Communications of the Association for Computing Machinery, vol. 34, No. 10, Oct. 1, 1991, pp. 34–48.

Drexler, K. Eric, et al., "Incentive Engineering for Computational Resource Management," The Ecology of Computation, Elsevier Science Publishers B.V., 1988, pp. 231–266.

Droms, R., "RFC 1541 Dynamic Host Configuration Protocol", HTTP://WWW.CIS.OHIO–STATE.EDU/HTBIN/RFC/RFC1541.HTML, Oct. 1993, pp. 1–33.

Emms J: "A Definition of an Access Control Systems Language" Computer Standards and Interfaces, vol. 6, No. 4, Jan. 1, 1987, pp. 443–454.

Gosling et al., "The Java (TM) Language Specification", Addison–Wesley, 1996.

Gottlob et al., "Extending Object–Oriented Systems with Roles," ACM Transactions on information systems, vol. 14, No. 3, pp. 268–296 (Jul. 1996).

Guth, Rob: "JavaOne: Sun to Expand Java Distributed Computing Effort", "HTTP://WWW.SUNWORLD.COM/SWOL–02–1998/SWOL–02–SUNSPOTS.HTML," XP–002109935, P.1, 1998.

Hamilton et al., "Subcontract: a flexible base for distributed programming"; Proceedings of 14th Symposium of Operating System Principles; (Dec. 1993).

Hartman, J., Manber, U., et al., Liquid Software: A new paradigm for networked systems, Technical Report 96–11, Department of Comp. Sci., Univ. of Arizona, Jun. 1996.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM: "Chapter 6—Distributed SOM (DSOM)" Somobjects Developer Toolkit Users Guide, Version 2.1, Oct. 1994 (1994–10), pp. 6–1–6–90.

Jones, Richard, et al., "Garbage Collection: Algorithms for Automatic Dynamic Memory Management," pp. 165–175, John Wiley & Sons, 1996.

Kay, Michael H. et al., "An Overview of the Raleigh Object–Oriented Database System", ICL Technical Journal, vol. 7, No. 4, pp. 780–798, (Nov. 1991), Oxford, GB.

Kougiouris et al.; "Support for Space Efficient Object Invocation in Spring"; (Sep. 1994).

Lindholm et al., "The Java (TM) Virtual Machine Specification", Addison Wesley, 1996.

Mitchell et al.; "An Overview of the Spring System"; (Feb. 1994).

Orfali R. et al., "The Essential Distributed Objects Survival Guide," Chapter 11: Corba Commercial ORBs, pp. 203–215, John Wiley & Sons, Inc., (1996).

Riggs Roger et al., "Pickling State in the Java (TM) System," USENIX Association Conference on Object–Oriented Technologies and Systems, XP–002112719, Jun. 17–21, 1996, pp. 241–250.

Rosenberry et al., "Understanding DCE"; Chapters 1–3, 6; (1992).

Venners, B., "Jini Technology, Out of the Box", Javaworld, Online!, pp 1–4, Dec. 1998.

Waldo J et al: "Events in an RPC based distributed system" Proceedings of the 1995 Usenix Technical Conference, Proceedings Usenix Winter 1995 Technical Conference, New Orleans, LA. USA, Jan. 16–20, 1995, pp. 131–142.

Wilson, P.R., et al., "Design of the Opportunistic Garbage Collector," Proceedings of the Object Oriented Programming Systems Languages And Applications Conference, New Orleans, vol. 24, No. 10, Oct. 1989.

Wu, Xuequn, "A Type system for an Object–Oriented Database System," Proceedings of the International Computer Software and Applications Conference (COMPSAC), pp. 333–338, Sep. 11–13, 1991, Tokyo, Japan.

Yemini, Y. and S. da silva, "Towards Programmable Networks", IFIP/IEEE International Workshop on Distributed Systems: Operations and Management, L'Aquila, Italy, Oct. 1996.

Yin J. et al., "Using Leases to Support Server Driven Consistency in Large–Scale Systems", Computer Services Department, University of Texas at Austin, p. 285–294.

* cited by examiner

APPARATUS AND METHOD FOR DYNAMICALLY VERIFYING INFORMATION IN A DISTRIBUTED SYSTEM

REFERENCE TO RELATED APPLICATIONS

Provisional U.S. patent application No. 60/076,048, now expired entitled "Distributed Computing System," filed on Feb. 26, 1998.

U.S. patent application Ser. No. 09/044,923 now U.S. Pat. No. 6,263,350, entitled "Method and System for Leasing Storage," and filed on the same date herewith.

U.S. patent application Ser. No. 09/044,838, entitled "Method, Apparatus, and Product for Leasing of Delegation Certificates in a Distributed System, " and filed on the same date herewith.

U.S. patent application Ser. No. 09/044,834 now pending, entitled "Method, Apparatus and Product for Leasing of Group Membership in a Distributed System, " filed on the same date herewith.

U.S. patent application Ser. No. 09/044,916 now U.S. Pat. No. 6,016,500, entitled "Leasing for Failure Detection, " and filed on the same date herewith.

U.S. patent application No. 09/044,933 now pending, entitled "Method for Transporting Behavior in Event Based System, " and filed on the same date herewith.

U.S. patent application Ser. No. 09/044,919 now U.S.Pat. No. 6,272,559, entitled "Deferred Reconstruction of Objects and Remote Loading for Event Notification in a Distributed System," and filed on the same date herewith.

U.S. patent application Ser. No. 09/044,938 now pending, entitled "Methods and Apparatus for Remote Method Invocation, "and filed on the same date herewith.

U.S. patent application Ser. No. 09/045,652 now U.S. Pat. No. 6,134,603, entitled "Method and System for Deterministic Hashes to identify Remote Methods, " and filed on the same date herewith.

U.S. patent application Ser. No. 09/044,790 now pending, entitled "Method and Apparatus for Determining Status of Remote Objects in a Distributed System, " and filed on the same date herewith.

U.S. patent application Ser. No. 09/044,930, now U.S. Pat. No. 6,393,497, entitled "Downloadable Smart Proxies for Performing Processing Associated with a Remote Procedure Call in a Distributed System," and filed on same date herewith.

U.S. patent application Ser. No. 09/044,917 now U.S. Pat. No. 6,237,024, entitled "Suspension and Continuation of Remote Methods," and filed on the same date herewith.

U.S. patent application Ser. No. 09/044,835 now U.S. Pat. No. 6,182,083, entitled "Method and System for Multi-Entry and Multi-Template Matching in a Database," and filed on the same date herewith.

U.S. patent application Ser. No. 09/044,839 now abandoned, entitled "Method and System for Inplace Modifications in a Database," and filed on the same date herewith.

U.S. patent application Ser. No. 09/044,945 now abandoned, entitled "Method and System for Typesafe Attribute Matching in a Database," and filed on the same date herewith.

U.S. patent application Ser. No. 09/044,931 now U.S. Pat. No. 6,185,611, entitled "Dynamin Lookup Service in a Distributed System," and filed on the same date herewith.

U.S. patent application Ser. No. 09/044,939 now pending, entitled "Apparatus and Method for Providing Downloadable Code for Use in Communicating with a Device in a Distributed System," filed on the same date herewith.

U.S. patent application Ser. No. 09/044,826 now pending, entitled "Method and System for Facilitating Access to a Lookup Service," and filed on the same date herewith.

U.S. patent application Ser. No. 09/044,936 now pending, entitled "An Interactive Design Tool for Persistent Shared Memory Spaces, " and filed on the same date herewith.

U.S. patent application Ser. No. 09/044,934 now pending, entitled "Polymorphic Token-Based Control," and filed on the same date herewith.

U.S. patent application Ser. No. 09/044,915 now U.S. Pat. No. 6,138,238, entitled "Stack-Based Access Control," and filed on the same date herewith.

U.S. patent application Ser. No. 09/044,944 now U.S. Pat. No. 6,226,746, entitled "Stack-Based Security Requirements," and filed on the same date herewith.

U.S. patent application Ser. No. 09/044,837 now U.S. Pat. No. 6,282,652, entitled "Per-Method Designation of Security Requirements," and filed on the same date herewith.

FIELD OF THE INVENTION

The present invention relates to a system and method for transmitting objects between machines in a distributed system and more particularly to dynamically verifying information in a distributed system.

BACKGROUND OF THE INVENTION

Distributed programs which concentrate on point-to-point data transmission can often be adequately and efficiently handled using special-purpose protocols for remote terminal access and file transfer. Such protocols are tailored specifically to the one program and do not provide a foundation on which to build a variety of distributed programs (e.g., distributed operating systems, electronic mail systems, computer conferencing systems, etc.).

While conventional transport services can be used as the basis for building distributed programs, these services exhibit many organizational problems, such as the use of different data types in different machines, lack of facilities for synchronization, and no provision for a simple programming paradigm.

Distributed systems usually contain a number of different types of machines interconnected by communications networks. Each machine has its own internal data types, its own address alignment rules, and its own operating system. This heterogeneity causes problems when building distributed systems. As a result, program developers must include in programs developed for such heterogeneous distributed systems the capability of dealing with ensuring that information is handled and interpreted consistently on different machines.

However, one simplification is afforded by noting that a large proportion of programs use a request and response interaction between processes where the initiator (i.e., program initiating a communication) is blocked waiting until the response is returned and is thus idle during this time. This can be modeled by a procedure call mechanism between processes. One such mechanism is referred to as the remote procedure call (RPC).

RPC is a mechanism for providing synchronized communication between two processes (e.g., program, applet, etc.) running on the same machine or different machines. In a simple case, one process, e.g., a client program, sends a message to another process, e.g., a server program. In this case, it is not necessary for the processes to be synchronized either when the message is sent or received. It is possible for the client program to transmit the message and then begin a new activity, or for the server program's environment to buffer the incoming message until the server program is ready to process a new message.

RPC, however, imposes constraints on synchronism because it closely models the local procedure call, which requires passing parameters in one direction, blocking the calling process (i.e., the client program) until the called procedure of the server program is complete, and then returning a response. RPC thus involves two message transfers, and the synchronization of the two processes for the duration of the call.

The RPC mechanism is usually implemented in two processing parts using the local procedure call paradigm, one part being on the client side and the other part being on the server side. Both of these parts will be described below with reference to FIG. 1.

FIG. 1 is a diagram illustrating the flow of call information using an RPC mechanism. As shown in FIG. 1, a client program 100 issues a call (step 102). The RPC mechanism 101 then packs the call as arguments of a call packet (step 103), which the RPC mechanism 101 then transmits to a server program 109 (step 104). The call packet also contains information to identify the client program 100 that first sent the call. After the call packet is transmitted (step 104), the RPC mechanism 101 enters a wait state during which it waits for a response from the server program 109.

The RPC mechanism 108 for the server program 109 (which may be the same RPC mechanism as the RPC mechanism 101 when the server program 109 is on the same platform as the client program 100) receives the call packet (step 110), unpacks the arguments of the call from the call packet (step 111), identifies, using the call information, the server program 109 to which the call was addressed, and provides the call arguments to the server program 109.

The server program receives the call (step 112), processes the call by invoking the appropriate procedure (step 115), and returns a response to the RPC mechanism 108 (step 116). The RPC 108 then packs the response in a response packet (step 114) and transmits it to the client program 100 (step 113).

Receiving the response packet (step 107) triggers the RPC mechanism 101 to exit the wait state and unpack the response from the response packet (step 106). RPC 101 then provides the response to the client program 100 in response to the call (step 105). This is the process flow of the typical RPC mechanism modeled after the local procedure call paradigm. Since the RPC mechanism uses the local procedure call paradigm, the client program 100 is blocked at the call until a response is received. Thus, the client program 100 does not continue with its own processing after sending the call; rather, it waits for a response from the server program 109.

The Java™ programming language is an object-oriented programming language that is typically compiled into a platform-independent format, using a bytecode instruction set, which can be executed on any platform supporting the Java virtual machine (JVM). This language is described, for example, in a text entitled "The Java Language Specification" by James Gosling, Bill Joy, and Guy Steele, Addison-Wesley, 1996, which is incorporated herein by reference. The JVM is described, for example, in a text entitled "The Java Virtual Machine Specification," by Tim Lindholm and Frank Yellin, Addison Wesley, 1996, which is incorporated herein by reference.

Because the JVM may be implemented on any type of platform, implementing distributed programs using the JVM significantly reduces the difficulties associated with developing programs for heterogenous distributed systems. Moreover, the JVM uses a Java remote method invocation system (RMI) that enables communication among programs of the system. RMI is explained in, for example, the following document, which is incorporated herein by reference: Remote Method Invocation Specification, Sun Microsystems, Inc. (1997), which is available via universal resource locator (URL) http://www.javasoft.com/products/jdk/1.1/docs/guide/rmi/spec/rmiTOC.doc.html.

FIG. 2 is a diagram illustrating the flow of objects in an object-oriented distributed system 200 including machines 201 and 202 for transmitting and receiving method invocations using the JVM. In system 200, machine 201 uses RMI 205 for responding to a call for object 203 by converting the object into a byte stream 207 including an identification of the type of object transmitted and data constituting the object. While machine 201 is responding to the call for object 203, a process running on the same or another machine in system 200 may continue operation without waiting for a response to its request.

Machine 202 receives the byte stream 207. Using RMI 206, machine 202 automatically converts it into the corresponding object 204, which is a copy of object 203 and which makes the object available for use by an program executing on machine 202. Machine 202 may also transmit the object to another machine by first converting the object into a byte stream and then sending it to the third machine, which also automatically converts the byte stream into the corresponding object.

The communication among the machines may include verification of data or other information. Such verification typically requires multiple calls for verification of particular data or other information, which may result in a large volume of calls and potentially increased expense for the verification. Accordingly, a need exists for efficient verification of data or other information in a distributed system.

SUMMARY OF THE INVENTION

A first method consistent with the present invention transmits a request for a verification object. A response to the request is received, including an indication of a first code corresponding to the verification object and an indication of a second code for processing associated with verification. The verification object is constructed using the indicated first code and information is verified using the indicated second code.

A second method consistent with the present invention transmits a request for a verification object. A response to the request is received, including an indication of a code corresponding to the verification object. The verification object is constructed using the indicated code and information is verified based on the constructed object.

A third method consistent with the present invention receives at a machine a request for an object for use in verification. A response to the request is transmitted, including an indication of a first code for constructing the verification object and including an indication of a second code for processing associated with the verification.

A first apparatus consistent with the present invention transmits a request for a verification object. The apparatus receives a response to the request, including an indication of a first code corresponding to the verification object and an indication of a second code for processing associated with verification. The apparatus constructs the verification object using the indicated first code and verifies information using the indicated second code.

A second apparatus consistent with the present invention transmits a request for a verification object and receives a response to the request, including an indication of a code corresponding to the verification object. The apparatus constructs the verification object using the indicated code and verifies information based on the constructed object.

A third apparatus consistent with the present invention receives at a machine a request for an object for use in verification. The apparatus transmits a response to the request, including an indication of a first code for constructing the verification object and including an indication of a second code for processing associated with the verification.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Overview

Machines consistent with the present invention may use a policy object, also referred to as a verification object, in a distributed system, the policy object performing processing when verification is needed. A machine downloads a policy object containing a reference to code governing verification of data or other information. The machine uses the reference to obtain the code and locally verify, for example, data constraints among items, data items, or objects. A verification object may also be used to verify other types of information. As particular rules for the data or information change, the policy object may be updated to provide a reference to the code for the new rules when it is downloaded.

Systems consistent with the present invention may efficiently transfer policy objects using a variant of an RPC or RMI, passing arguments and return values from one process to another process each of which may be on different machines. The term "machines" is used in this context to refer to a physical machine or a virtual machine. Multiple virtual machines may exist on the same physical machine. Examples of RPC systems include distributed computed environment (DCE) RPC and Microsoft distributed common object model (DCOM) RPC.

Distributed Processing Systems

Figure 1:
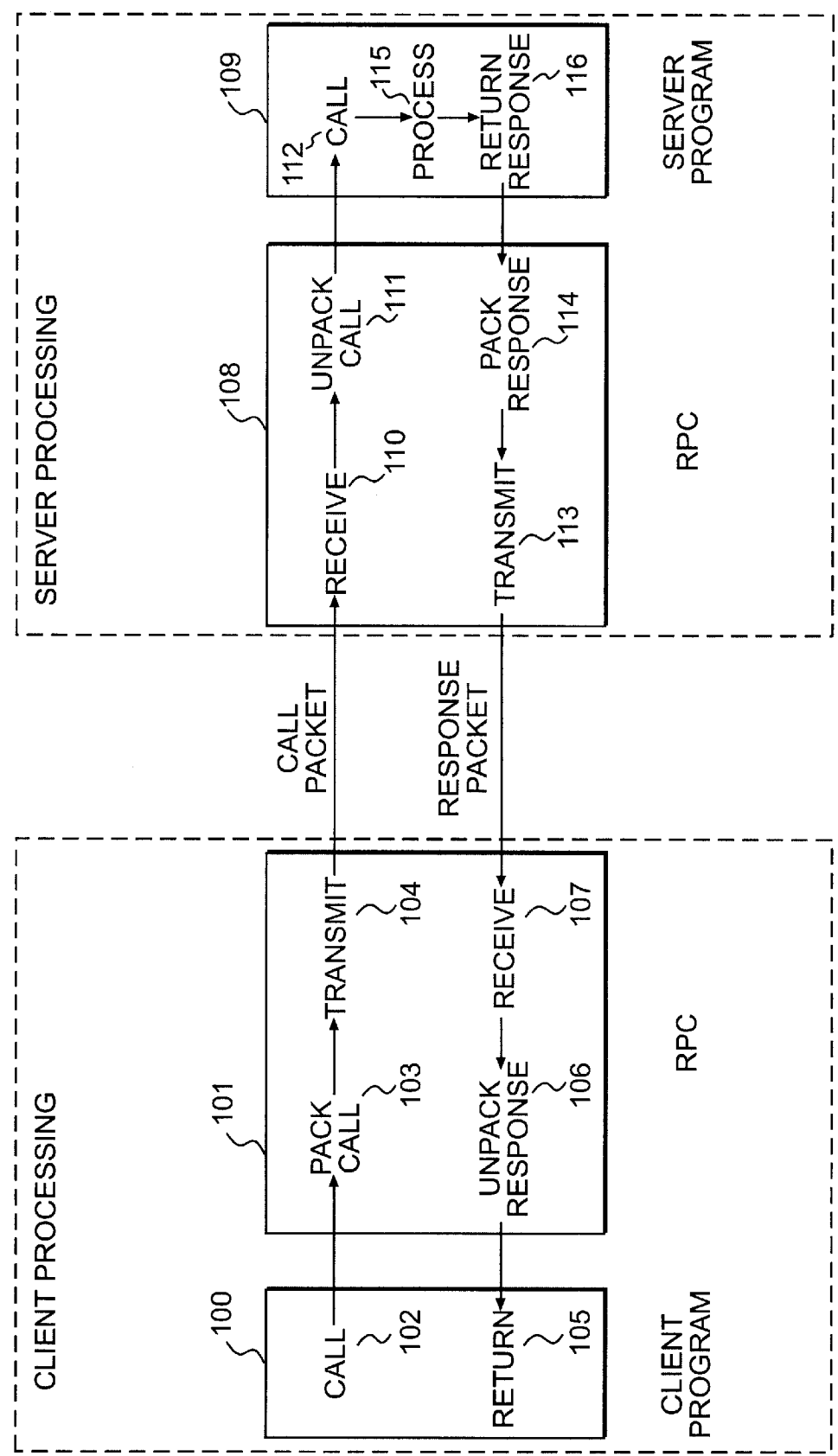
FIG. 1 is a diagram illustrating the flow of call information using an RPC mechanism.
Figure 2:
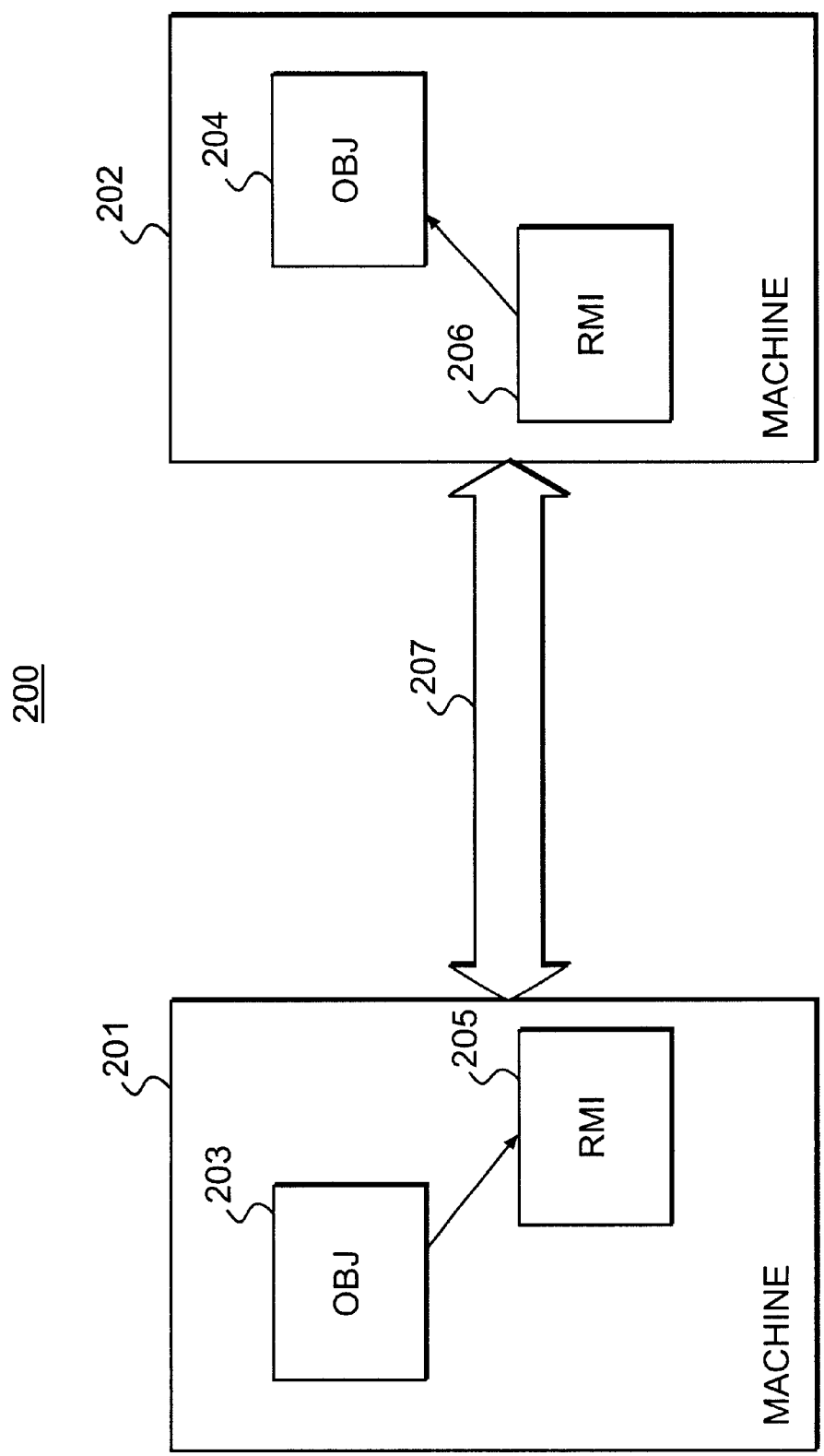
FIG. 2 is a diagram illustrating the transmission of objects in an object-oriented distributed system.
Figure 3:
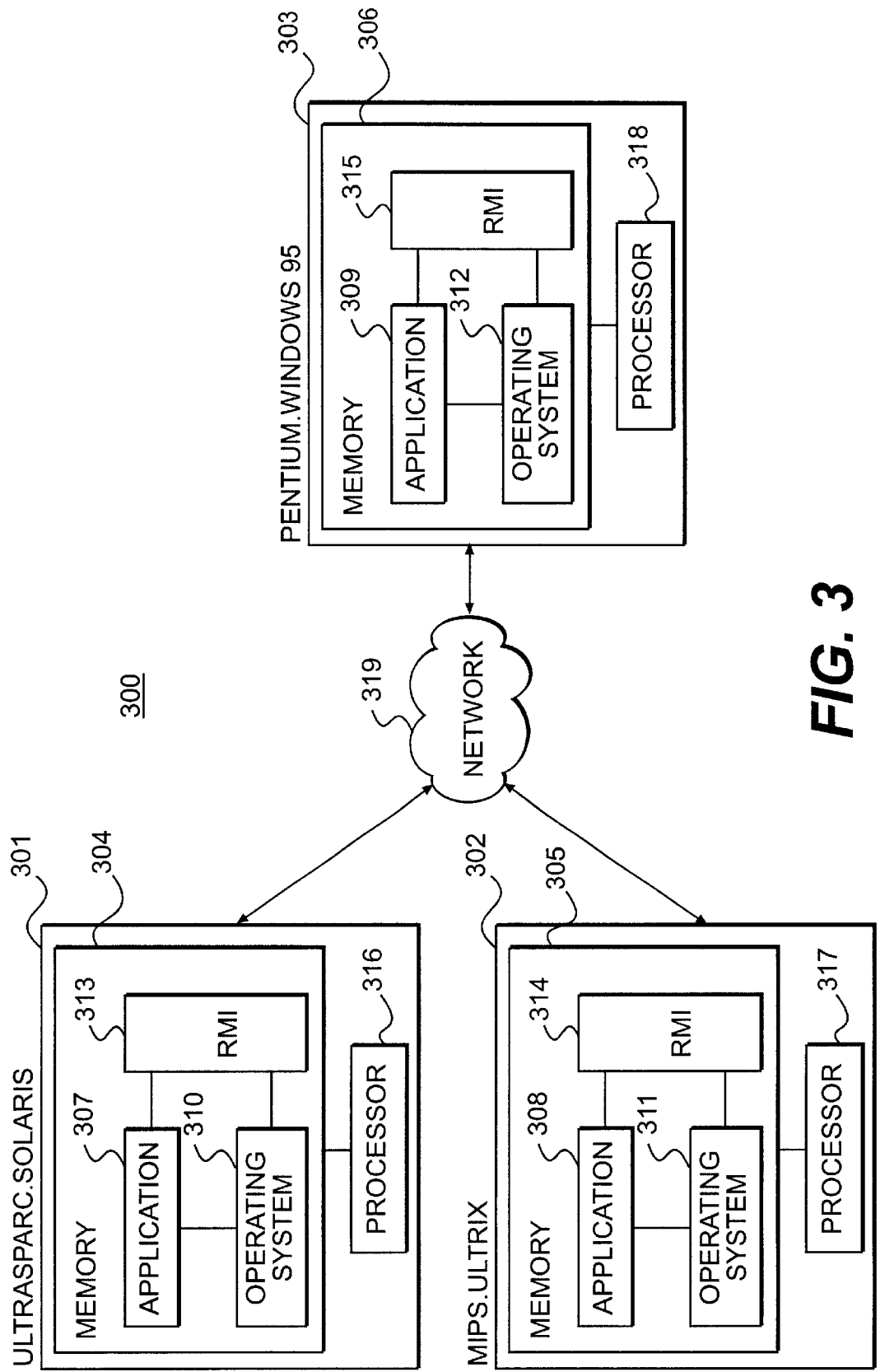
FIG. 3 is a diagram of an exemplary distributed processing system that can be used in an implementation consistent with the present invention.

FIG. 3 illustrates an exemplary distributed processing system 300 which can be used in an implementation consistent with the present invention. In FIG. 3, distributed processing system 300 contains three independent and heterogeneous platforms 301, 302, and 303 connected in a network configuration represented by network cloud 319. The composition and protocol of the network configuration represented by cloud 319 is not important as long as it allows for communication of the information between platforms 301, 302 and 303. In addition, the use of just three platforms is merely for illustration and does not limit an implementation consistent with the present invention to the use of a particular number of platforms. Further, the specific network architecture is not crucial to embodiments consistent with this invention. For example, another network architecture that could be used in an implementation consistent with this invention would employ one platform as a network controller to which all the other platforms would be connected.

In the implementation of distributed processing system 300, platforms 301, 302 and 303 each include a processor 316, 317, and 318 respectively, and a memory, 304, 305, and 306, respectively. Included within each memory 304, 305, and 306, are applications 307, 308, and 309, respectively, operating systems 310, 311, and 312, respectively, and RMI components 313, 314, and 315, respectively.

Applications 307, 308, and 309 can be programs that are either previously written and modified to work with, or that are specially written to take advantage of, the services offered by an implementation consistent with the present invention. Applications 307, 308, and 309 invoke operations to be performed in accordance with an implementation consistent with this invention.

Operating systems 310, 311, and 312 are typically standard operating systems tied to the corresponding processors 316, 317, and 318, respectively. The platforms 301, 302, and 303 can be heterogenous. For example, platform 301 has an UltraSparc® microprocessor manufactured by Sun Microsystems, Inc. as processor 316 and uses a Solaris® operating system 310. Platform 302 has a MIPS microprocessor manufactured by Silicon Graphics Corp. as processor 317 and uses a Unix operating system 311. Finally, platform 303 has a Pentium microprocessor manufactured by Intel Corp. as processor 318 and uses a Microsoft Windows 95 operating system 312. An implementation consistent with the present invention is not so limited and could accommodate homogenous platforms as well.

Sun, Sun Microsystems, Solaris, Java, and the Sun Logo are trademarks or registered trademarks of Sun Microsystems, Inc. in the United States and other countries. UltraSparc and all other SPARC trademarks are used under license and are trademarks of SPARC International, Inc. in the United States and other countries. Products bearing SPARC trademarks are based upon an architecture developed by Sun Microsystems, Inc.

Memories 304, 305, and 306 serve several functions, such as general storage for the associated platform. Another function is to store applications 307, 308, and 309, RMI components 313, 314, and 315, and operating systems 310, 311, and 312 during execution by the respective processor 316, 317, and 318. In addition, portions of memories 304, 305, and 306 may constitute shared memory available to all of the platforms 301, 302, and 303 in network 319. Note that RMI components 313, 314, and 315 operate in conjunction with a JVM, which is not shown for the purpose of simplifying the figure.

Distributed System Infrastructure

Systems and methods consistent with the present invention may also operate within a particular distributed system 400, which will be described with reference to FIGS. 4 and 5. This distributed system 400 is comprised of various components, including hardware and software, to (1) allow users of the system to share services and resources over a network of many devices; (2) provide programmers with tools and programming patterns that allow development of robust, secured distributed systems; and (3) simplify the task of administering the distributed system. To accomplish these goals, distributed system 400 utilizes the Java programming environment to allow both code and data to be moved from device to device in a seamless manner. Accordingly, distributed system 400 is layered on top of the Java programming environment and exploits the characteristics of this environment, including the security offered by it and the strong typing provided by it.

Figure 4:
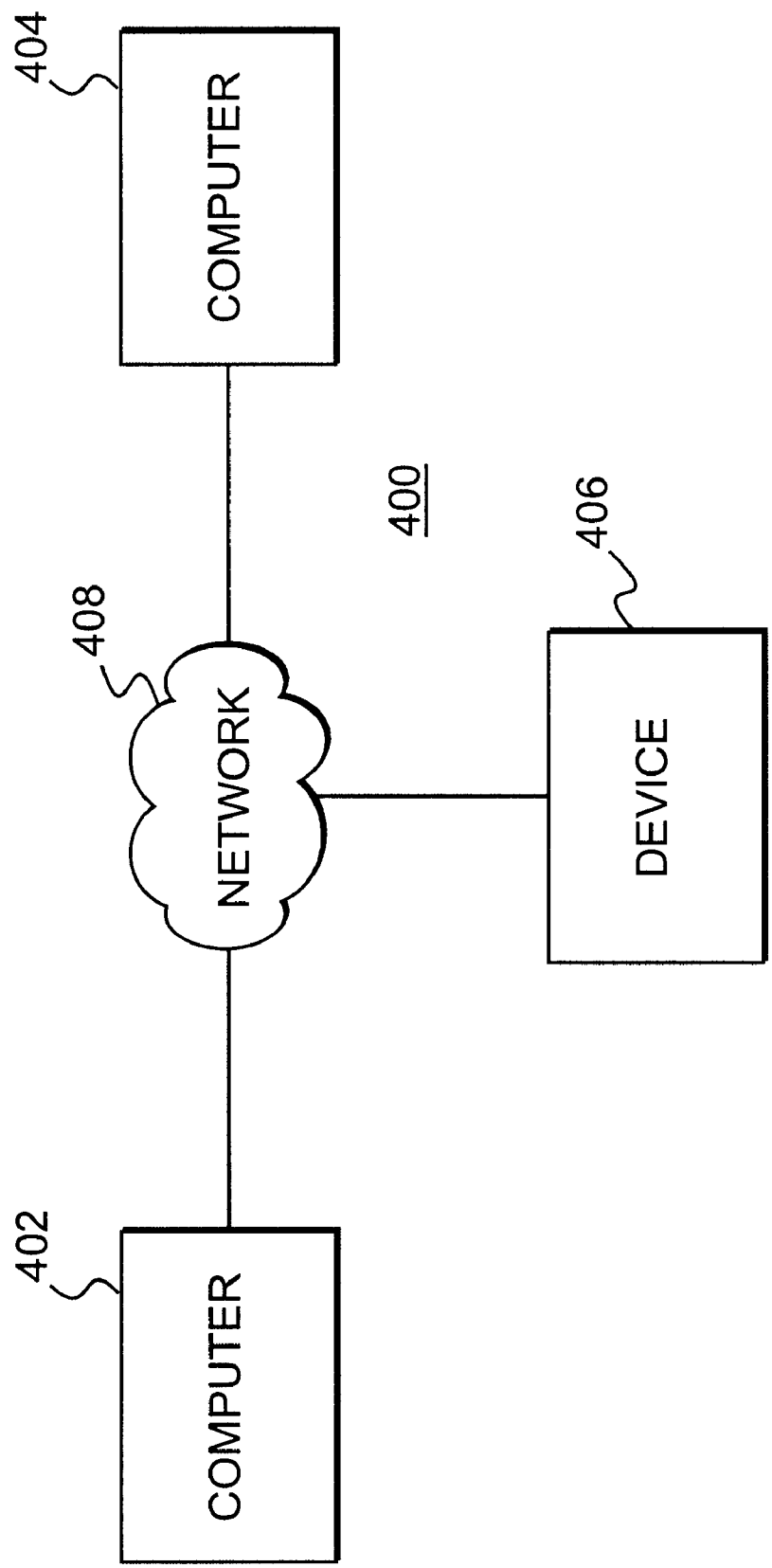
FIG. 4 is a diagram of an exemplary distributed system infrastructure.
Figure 5:
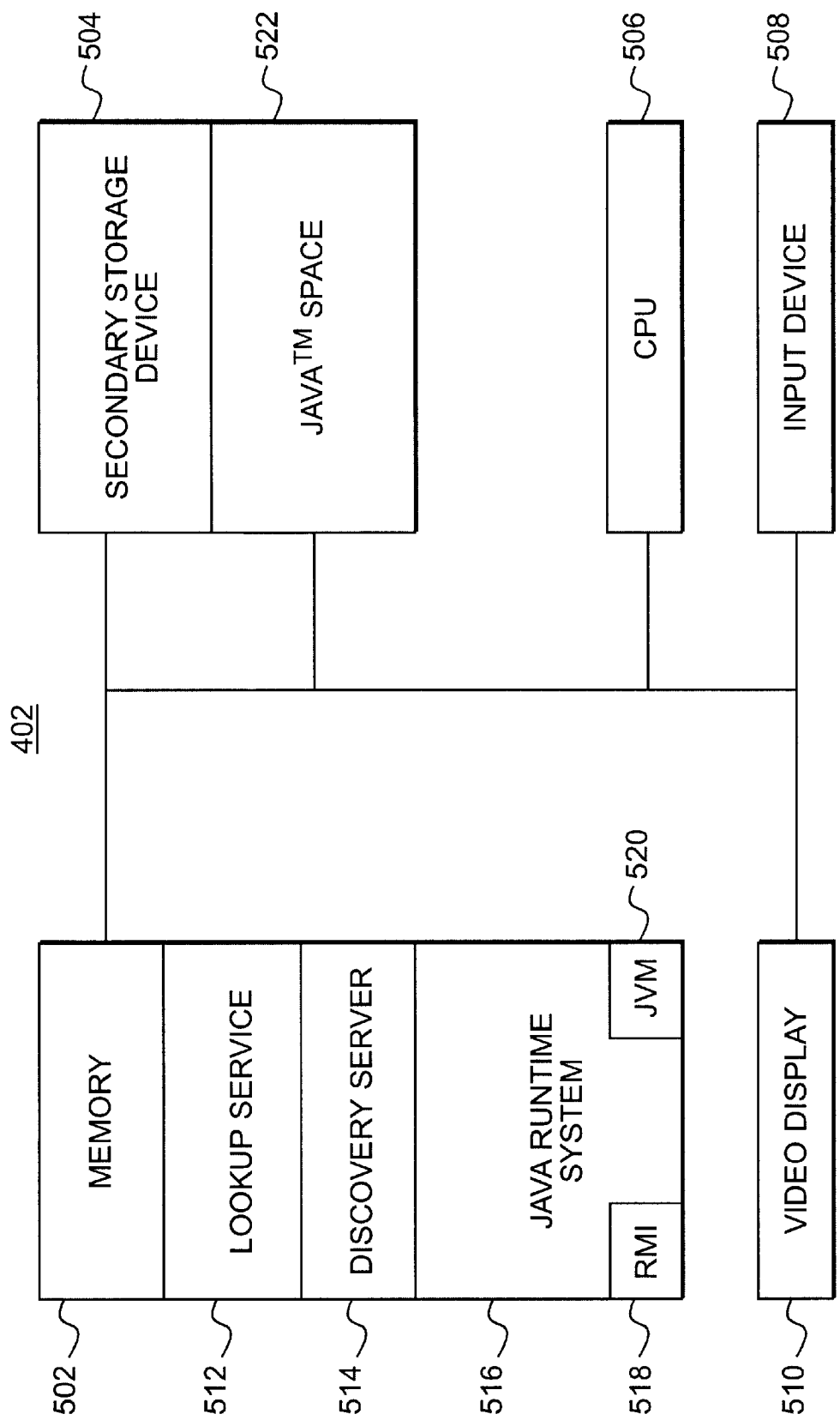
FIG. 5 is a diagram of a computer in a distributed system infrastructure shown in FIG. 4.

In distributed system 400 of FIGS. 4 and 5, different computers and devices are federated into what appears to the user to be a single system. By appearing as a single system, distributed system 400 provides the simplicity of access and the power of sharing that can be provided by a single system without giving up the flexibility and personalized response of a personal computer or workstation. Distributed system 400 may contain thousands of devices operated by users who are geographically disperse, but who agree on basic notions of trust, administration, and policy.

Within an exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as programs or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

Distributed system 400 is comprised of computer 402, a computer 404, and a device 406 interconnected by a network 408. Device 406 may be any of a number of devices, such as a printer, fax machine, storage device, computer, or other devices. Network 408 may be a local area network, wide area network, or the Internet. Although only two computers and one device are depicted as comprising distributed system 400, one skilled in the art will appreciate that distributed system 400 may include additional computers or devices.

FIG. 5 depicts computer 402 in greater detail to show a number of the software components of distributed system 400. One skilled in the art will appreciate that computer 404 or device 406 may be similarly configured. Computer 402 includes a memory 502, a secondary storage device 504, a central processing unit (CPU) 506, an input device 508, and a video display 510. Memory 502 includes a lookup service 512, a discovery server 514, and a Java runtime system 516. The Java runtime system 516 includes the Java RMI system 518 and a JVM 520. Secondary storage device 504 includes a Java space 522.

As mentioned above, distributed system 400 is based on the Java programming environment and thus makes use of the Java runtime system 516. The Java runtime system 516 includes the Java API libraries, allowing programs running on top of the Java runtime system to access, in a platform-independent manner, various system functions, including windowing capabilities and networking capabilities of the host operating system. Since the Java API libraries provides a single common API across all operating systems to which the Java runtime system is ported, the programs running on top of a Java runtime system run in a platform-independent manner, regardless of the operating system or hardware configuration of the host platform. The Java runtime system 516 is provided as part of the Java software development kit available from Sun Microsystems, Inc. of Mountain View, Calif.

JVM 520 also facilitates platform independence. JVM 520 acts like an abstract computing machine, receiving instructions from programs in the form of bytecodes and interpreting these bytecodes by dynamically converting them into a form for execution, such as object code, and executing them. RMI 518 facilitates remote method invocation by allowing objects executing on one computer or device to invoke methods of an object on another computer or device. Both RMI and the JVM are also provided as part of the Java software development kit.

Lookup service 512 defines the services that are available for a particular Djinn. That is, there may be more than one Djinn and, consequently, more than one lookup service within distributed system 400. Lookup service 512 contains one object for each service within the Djinn, and each object contains various methods that facilitate access to the corresponding service. Lookup service 512 is described in U.S. patent application entitled "Method and System for Facilitating Access to a Lookup Service," which was previously incorporated herein by reference.

Discovery server 514 detects when a new device is added to distributed system 400, during a process known as boot and join (or discovery), and when such a new device is detected, the discovery server passes a reference to lookup service 512 to the new device so that the new device may register its services with the lookup service and become a member of the Djinn. After registration, the new device becomes a member of the Djinn, and as a result, it may access all the services contained in lookup service 512. The process of boot and join is described in U.S. patent application entitled "Apparatus and Method for providing Downloadable Code for Use in Communicating with a Device in a Distributed System," which was previously incorporated herein by reference.

A Java space 522 is an object repository used by programs within distributed system 400 to store objects. Programs use a Java space 522 to store objects persistently as well as to make them accessible to other devices within distributed system 400. Java spaces are described in U.S. patent application Ser. No. 08/971,529, now U.S. Pat. No. 6,032,151 entitled "Database System Employing Polymorphic Entry and Entry Matching," assigned to a common assignee, and filed on Nov. 17, 1997, which is incorporated herein by reference. One skilled in the art will appreciate that an exemplary distributed system 400 may contain many lookup services, discovery servers, and Java spaces.

Data Flow in a Distributed Processing System

Figure 6:
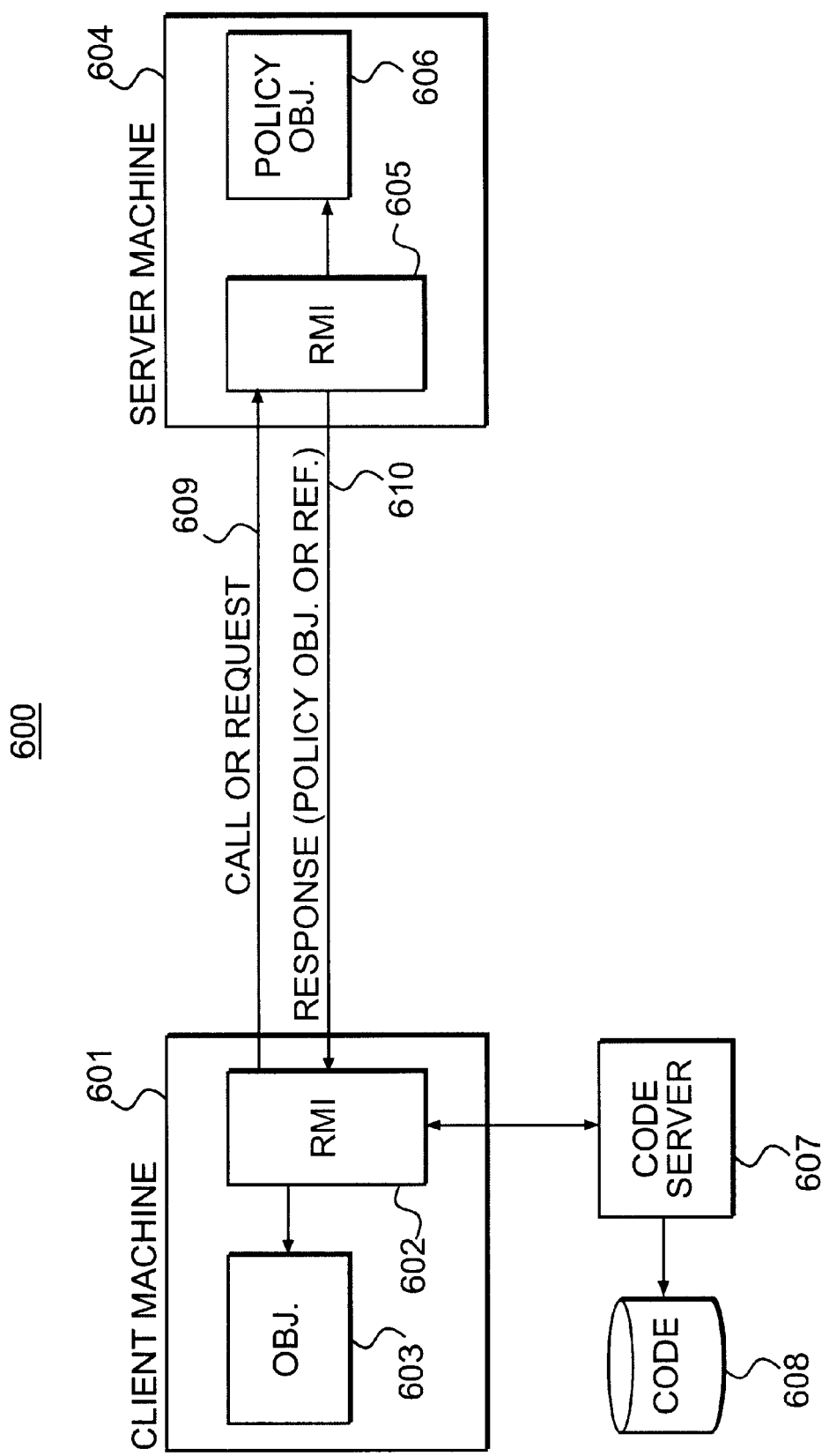
FIG. 6 is a diagram of an exemplary distributed network for use in transmission of a policy object.

FIG. 6 is a diagram of an object-oriented distributed network 600 for use in transmission of a policy object for use in verification. Network 600 includes client machine 601 and server machine 604, which may be implemented with computers or virtual machines executing on one or more computers, or the machines described with reference to FIGS. 3, 4, and 5. Client machine 601 includes RMI 602 and associated object 603. Server machine 604 includes RMI 605 and associated policy object 606.

Client machine 601, using RMI 602, transmits a call or request 609 to RMI 605 requesting a policy object 606. In response, RMI 605 transmits in call 610 policy object 606 or a reference to it. RMI 602 and client machine 601 use the policy object, represented as object 603, for verification of data or other information. If necessary, RMI 602 may access code server 607 to obtain code 608 used by the policy object. A code server is an entity and process that has access to code and responds to requests for a particular type or class of object and returns code for that object. A code server may be located within machine 604 or on another machine. Also, the code may be resident on the same platform as the code server or on a separate platform.

RMI 602 may access such code by using a network-accessible location in the form of a URL for code that is associated with the object. URLs are known in the art and an explanation, which is incorporated herein by reference, appears in, for example, a text entitled "The Java Tutorial: Object-Oriented Programming for the Internet," pp. 494–507, by Mary Campione and Kathy Walrath, Addison-Wesley, 1996.

The objects may be transmitted as object streams as described in The Object Serialization Specification or The RMI Specification, both available from Sun Microsystems, Inc. Streams, including input and output streams, are also described in, for example, the following text, which is incorporated herein by reference: "The Java Tutorial: Object-Oriented Programming for the Internet," pp. 325–53, by Mary Campione and Kathy Walrath, Addison-Wesley, 1996.

Transmission of a Policy Object

Figure 7:
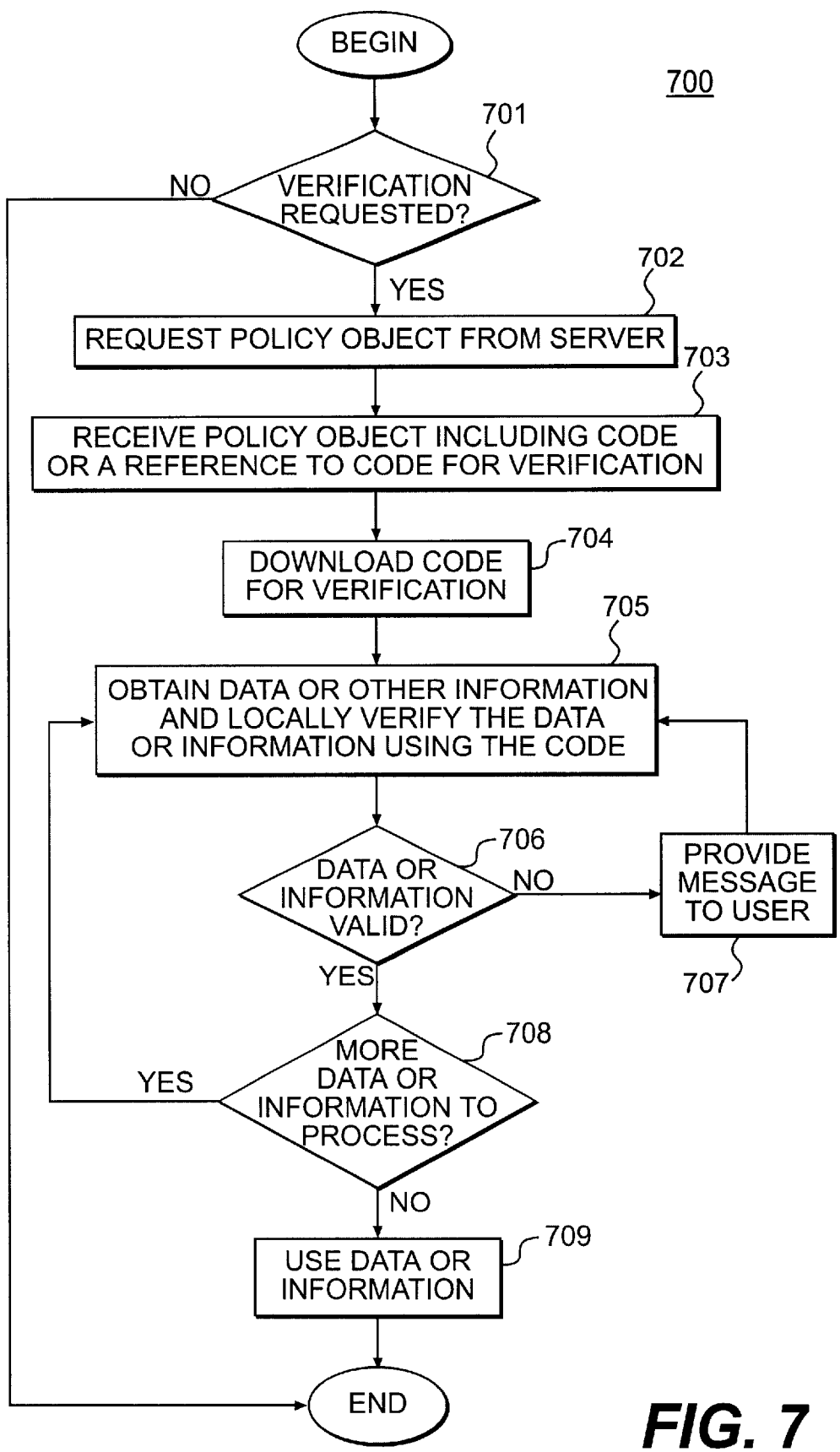
FIG. 7 is a flow chart of a process for data validation using a policy object.

FIG. 7 is a flow chart of a process 700 for verification using a policy object, also referred to as a verification object. A machine first determines if verification is requested (step 701). If so, it requests a policy object from a server (step 702) and receives the policy object including a reference to code for use in verification of data or other information (step 703). Using the reference, it downloads code for the verification (step 704). The downloading of code may occur using the methods described in U.S. patent application Ser. No. 08/950,756, filed on Oct. 15, 1997, and entitled "Deferred Reconstruction of Objects and Remote Loading in a Distributed System," which is incorporated herein by reference.

The machine then obtains data or other information (step 705). It determines if the data or information is valid using the policy object (step 706), which may occur through local processing. Validation may be based on particular pre-defined criteria. If the data or information was not valid, it obtains new data or information; for example, it provides a message to the user requesting re-entry of the data (step 707). The machine then determines if there is more data or information to process (step 708). If so, it returns to step 705 to receive and verify additional data. Otherwise, it makes use of the verified data or other information (step 709); for example, it may submit data to the server. During these steps, the server may send an indication of code, such as a reference to the code or the code itself, for updating the policy or rules concerning verification. Thus, the policy or rules may be dynamically updated so that client machines receive and maintain code or a reference to code for the current policy or rules.

Machines implementing the steps shown in FIG. 7 may include computer processors for performing the functions, as shown in FIGS. 3, 4, 5, and 6. They may include modules or programs configured to cause the processors to perform the above functions. They may also include computer program products stored in a memory. The computer program products may include a computer-readable medium or media having computer-readable code embodied therein for causing the machines to perform functions described in this specification. The media may include a computer data signal embodied in a carrier wave and representing sequences of instructions which, when executed by a processor, cause the processor to securely address a peripheral device at an absolute address by performing the method described in this specification. The media may also include data structures for use in performing the method described in this specification. In addition, the processing shown in FIG. 7 may occur through the use of smart proxies, which are described in U.S. patent application filed on even date herewith, assigned to a common assignee, and entitled "Downloadable Smart Proxies for Performing Processing Associated with a Remote Procedure Call in a Distributed System," which is incorporated herein by reference.

Example of a Policy Object

The following provides an example of using a policy object to verify data in an expense report consistent with the present invention. Table 1 provides an example of a remote policy interface written in the Java programming language defining methods a client can invoke on a server for this expense report example.

TABLE 1

```
public interface ExpenseServer extends Remote {
    Policy getPolicy () throws RemoteException;
    void submitReport (ExpenseReport report)
            throws RemoteException, InvalidReportException;
}
```

The interface shown in Table 1 supports two methods. A get policy ("getPolicy") method returns an object that implements the interface. A submit report ("submitReport") method submits a completed expense request, throwing (generating) an exception if the report is malformed for any reason. The policy interface declares a method, shown in Table 2, informing a client whether it is acceptable to add an entry to the expense report.

TABLE 2

```
public interface Policy {
    void checkValid (ExpenseEntry entry)
            throws Policy ViolationException;
}
```

If an expense report entry is valid, meaning that it matches current policy, the method returns normally. Otherwise it throws an exception that describes the error. The exemplary policy interface may be local (not remote) and thus may be implemented by an object local to a client. Table 3 illustrates how the client may operate for this example.

TABLE 3

```
Policy curPolicy = server.getPolicy ();
start a new expense report
show the GUI to the user
while (user keeps adding entries) {
    try {
        curPolicy.checkValid(entry); // throws exception if not OK
            add the entry to the expense report
    } catch (policyViolationException e) {
        show the error to the user
    }
}
server. submitReport (report);
```

When a user requests the client software to start up a new expense report, the client invokes "server.getPolicy" method to ask the server to return an object that embodies the current expense policy. Each entry that is added is first submitted to that policy object for approval. If the policy object reports no error, the entry is added to the report; otherwise the error is displayed to the user for corrective action. When the user is finished adding entries to the report, the entire report is submitted.

Table 4 illustrates how the server may operate for this example.

TABLE 4

```
import java.rmi.*;
import java.rmi.server.*;
class ExpenseServerImpl
    extends UnicastRemoteObject
    implements ExpenseServer
{
    ExpenseServerImpl () throws RemoteException {
        // . . . set up server state . . .
    }
    public Policy getPolicy () {
        return new TodaysPolicy();
    }
    public void submitReport (ExpenseReport report) {
        // . . . write the report into the db . . .
    }
}
```

The type "UnicastRemoteObject" defines the kind of remote object corresponding to this server, in this example a single server as opposed to a replicated service. The Java programming language class "ExpenseServerImpl" implements the methods of the remote interface "ExpenseServer." Clients on remote hosts can use RMI to send messages to "ExpenseServerImpl" objects.

Table 5 provides an example of an implementation of a policy for this expense report example.

TABLE 5

```
public class TodaysPolicy implements Policy {
    public void checkValid(ExpenseEntry entry)
        throws Policy ViolationException
    {
        if (entry.dollars() < 20) {
            return; // no receipt required
        } else if (entry.haveReceipt() == false) {
            throw new Policy ViolationException ("receipt required");
        }
    }
}
```

The policy defined in Table 5 checks to ensure that any entry without a receipt is less than twenty dollars. If the policy changes tomorrow so that only meals under twenty dollars are exempt from the "receipts required" policy, an implementation of new policy may be provided as shown in Table 6.

TABLE 6

```
public class TomorrowsPolicy implements Policy {
    public void checkValid(ExpenseEntry entry)
        throws PolicyViolationException
    {
        if(entry.isMeal() && entry.dollars() < 20) {
            return; // no receipt required
        } else if (entry.haveReceipt() == false) {
            throw new PolicyViolationException ("receipt required");
        }
    }
}
```

The new policy ("TomorrowsPolicy") defined in Table 6 may be installed on a server, and the server may then deliver the new policy objects instead of the current ("TodaysPolicy") objects. When a client invokes the server's get policy method, RMI on the client verifies whether the returned object is of a known type. The first time each client encounters a "TomorrowsPolicy" object, the client's RMI downloads the implementation for the policy before "get-Policy" method returns, and the client thus begins enforcing the new policy. This expense report example is only one example of use of a policy object for verification, and many other applications of a policy object are possible.

Although the illustrative embodiments of the systems consistent with the present invention are described with reference to a computer system implementing the Java programming language on the JVM specification, the invention is equally applicable to other computer systems processing code from different programming languages. Specifically, the invention may be implemented with both object-oriented and nonobject-oriented programming systems. In addition, although an embodiment consistent with the present invention has been described as operating in the Java programming environment, one skilled in the art will appreciate that the present invention can be used in other programming environments as well.

While the present invention has been described in connection with an exemplary embodiment, it will be understood that many modifications will be readily apparent to those skilled in the art, and this application is intended to cover any adaptations or variations thereof. For example, different labels or definitions for the policy object may be used without departing from the scope of the invention. This invention should be limited only by the claims and equivalents thereof.

What is claimed is:

1. A method for verifying data in a distributed system, comprising:

determining whether a need exists to verify data;

transmitting a request for a verification object;

receiving from a romote device the verification object in response to the request, the verification object including a first executable code;

constructing second executable code from the first executable code included in the verification object; and verifying the data by executing at least one of the first executable code included in the verification object, the second executable code, a combination of part of the first executable code included in the verification object and the second executable code, and a combination of both the first executable code included in the verification object and the second executable code.

2. The method of claim 1, further comprising:

generating a notification indicating a successful verification of the data based on a result of the verifying step.

3. The method of claim 1, further comprising:

determining whether a need exists to verify additional data; and based on the determination that a need exists to verify additional data, verifying the additional data by executing at least one of the first executable code included in the verification object, the second executable code, the combination of part of the first executable code included in the verification object and the second executable code, and the combination of both the first executable code included in the verification object and the second executable code.

4. The method of claim 3, wherein the step of determining whether a need exists to verify additional data includes:

determining whether at least one of the first executable code included in the verification object, the second executable code, the combination of part of the first executable code included in the verification object and the second executable code, and the combination of both the first executable code included in the verification object and the second executable code is suitable for purposes of verifying the additional data, wherein the step of verifying the additional data is performed based on a result of the determination that a least one of the first executable code included in the verification object, the second executable code, the combination of part of the first executable code included in the verification object and the second executable code, and the combination of both the first executable code included in the verification object and the second executable code is suitable for purposes of verifying the additional data.

5. A method for verifying data in a distributed system, comprising:

determining whether a need exists to verify data;

transmitting a request for a verification object;

receiving from a remote device a response to the request including a first executable code; and constructing the verification object using the first executable code, the verification object exhibiting second executable code for processing associated with verifying the data.

6. The method of claim 5, wherein constructing the verification object using the first executable code, the further comprises:

selectively determining from the verification object whether to obtain the first executable code from a repository of executable code, and, based on the a result of this determination, obtaining the first executable code from the repository; and constructing second executable code from the first executable code included in the verification object.

7. The method of claim 5, further comprising:

verifying the data by executing at least one of the first executable code included in the verification object, the second executable code, a combination of part of the first executable code included in the verification object and the second executable code, and a combination of both the first executable code included in the verification object and the second executable code.

8. The method of claim 5, further comprising:

generating a notification indicating a successful verification of the data based on a result of the verifying step.

9. The method of claim 5, further comprising:

determining whether a need exists to verify additional data; and based on the determination that a need exists to verify additional data, verifying the additional data by executing at least one of the first executable code included in the verification object, the second executable code, the combination of part of the first executable code included in the verification object and the second executable code, and the combination of both the first executable code included in the verification object and the second executable code without transmitting a new request for a verification object.

10. The method of claim 9, wherein the step of determining whether a need exists to verify additional data includes:

determining whether the first executable code is suitable for purposes of verifying the additional data, wherein the step of verifying the additional data without transmitting a new request for a verification object is performed based on a result of the determination that at least on of the first executable code included in the verification object, the second executable code, the combination of part of the first executable code included in the verification object and the second executable code, and the combination of both the first executable code included in the verification object and the second executable code is suitable for purposes of verifying the additional data.

11. An apparatus, comprising:

a memory storing a program; and a processor responsive to the program to determine whether a need exists to verify data, transmit a request for a verification object, receive from a remote device the verification object in response to the request, the verification object including a first executable code, construct second executable code from the first executable code included in the verification object, and verify the data by executing at least one of the first executable code included in the verification object, the second executable code, a combination of part of the first executable code included in the verification object and the second executable code, and a combination of both the first executable code included in the verification object and the second executable code.

12. The apparatus of claim 11, wherein processor further generates a notification indicating a successful verification of the data based on a result of the verifying step.

13. The apparatus of claim 11, wherein the processor further determines whether a need exists verify additional data, and based on the determination that a need exists to verify additional data, verifying the additional data by executing at least one of the first executable code included in the verification object, the second executable code, the combination of part of the first executable code included in the verification object and the second executable code, and the combination of both the first executable code included in the verification object and the second executable code.

14. The apparatus of claim 13, wherein when the processor determines whether a need exists to verify additional data, the processor further determines whether at least one of the first executable code included in the verification object, the second executable code, the combination of part of the first executable code included in the verification object and the second executable code, and the combination of both the first executable code included in the verification object and the second executable code is suitable for purposes of verifying the additional data, wherein verifying the additional data is performed based on a result of the determination that at least one of the first executable code included in the verification object, the second executable code, the combination of part of the first executable code included in the verification object and the second executable code, and the combination of both the first executable code included in the verification object and the second executable code is suitable for purposes of verifying the additional data.

15. An apparatus, comprising:
   a memory storing a program; and
   a processor responsive to the program to
      determine whether a need exists to verify data,
      transmit a request for a verification object,
      receive from a remote device a response to the request including a first executable code, and
      construct the verification object using the first executable code, the verification object exhibiting second executable code for processing associated with verifying the data.

16. The apparatus of claim 15, wherein when the processor constructs the verification object using the first executable code, the processor further determines from the verification object whether to obtain the first executable code from a repository of executable code, and, based on the a result of this determination, obtains the first executable code from the repository, and constructs second executable code from the first executable code included in the verification object.

17. The apparatus of claim 15, wherein the processor further verifies the data by executing at least one of the first executable code included in the verification object, the second executable code, a combination of part of the first executable code included in the verification object and the second executable code, and a combination of both the first executable code included in the verification object and the second executable code.

18. The apparatus of claim 15, wherein the processor further generates a notification indicating a successful verification of the data based on a result of the verifying step.

19. The apparatus of claim 15, wherein the processor further determines whether a need exists to verify additional data, and based on the determination that a need exists to verify additional data, verifies the additional data by executing at least one of the first executable code included in the verification object, the second executable code, the combination of part of the first executable code included in the verification object and the second executable code, and the combination of both the first executable code included in the verification object and the second executable code without transmitting a new request for a verification object.

20. The apparatus of claim 19, wherein when the processor determines whether a need exists to verify additional data, the processor further determines whether the executable code is suitable for purposes of verifying the additional data, wherein verifying the additional data without transmitting a new request for a verification object is performed based on a result of the determination that at least one of the first executable code included the verification object, the second executable code, the combination of part of the first executable code included in the verification object and the second executable code, and the combination of both the first executable code included in the verification object and the second executable code is suitable for purposes of verifying the additional data.

21. A computer-readable medium containing instructions for causing a processor to perform a method for verifying data in a distributed system, the method comprising:
   determining whether a need exists to verify data;
   transmitting a request for a verification object;
   receiving from a remote device the verification object in response to the request, the verification object including a first executable code;
   constructing second executable code from the first executable code included in the verification object; and
   verifying the data by executing at least one of the first executable code included in the verification object, the second executable code, a combination of part of the first executable code included in the verification object and the second executable code, and a combination of both the first executable code included in the verification object and the second executable code.

22. The computer-readable medium of claim 21, further comprising:
   generating a notification indicating a successful verification of the data based on a result of the verifying step.

23. The computer-readable medium of claim 21, further comprising:
   determining whether a need exists to verify additional data; and
   based on the determination that a need exists to verify additional data, verifying the additional data by executing at least one of the first executable code included in the verification object, the second executable code, the combination of part of the first executable code included in the verification object and the second executable code, and the combination of both the first executable code included in the verification object and the second executable code.

24. The computer-readable medium of claim 23, wherein the step of determining whether a need exists to verify additional data includes:
   determining whether at least one of the first executable code included in the verification object, the second executable code, the combination of part of the first executable code included in the verification object and the second executable code, and the combination of both the first executable code included in the verification object and the second executable code is suitable for purposes of verifying the additional data; wherein the step of verifying the additional data is performed additional data is preformed on a result on a result of the determination that at least one of the first executable code included in the verification object, the second executable code, the combination of part of the first executable code included in the verification object and the second executable code, and the combination of both the first executable code included in the verification object and the second executable code is suitable for purposes of verifying the additional data.

25. A computer-readable medium containing instructions for causing a processor to perform a method for verifying data in a distributed system, the method comprising:
   determining whether a need exists to verify data;
   transmitting a request for a verification object;
   receiving from a remote device a response to the request including a first executable code; and
   constructing the verification object using the first executable code, the verification object exhibiting second executable code for processing associated with verifying the data.

26. The computer-readable medium of claim 25, wherein constructing the verification object using the first executable code further comprises:
    selectively determining from the verification object whether to obtain the first executable code from a repository of executable code from the repository; and
    constructing second executable code from the first executable code included in the verification object.

27. The computer-readable medium of claim 25, further comprising:
    verifying the data by executing at least one of the first executable code included in the verification object, the second executable code, a combination of part of the first executable code included in the verification object and the second executable code, and a combination of both the first executable code included in the verification object and the second executable code.

28. The computer-readable medium of claim 25, further comprising:
    generating a notification indicating a successful verification of the data based on a result of the verifying step.

29. The computer-readable medium of claim 25, further comprising:
    determining whether a need exists to verify additional data; and
    based on the determination that a need exists to verify additional data; verifying the additional data by executing at least on of the first executable code included in the verification object, the second executable code, the combination of part of the first executable code included in the verification object and the second executable code, and the combination of both the first executable code included in the verification object and the second executable code without transmitting a new request for verification object.

30. The computer-readable medium of claim 29, wherein the step of determining whether a need exists to verify additional data includes:
    determining whether the first executable code is suitable for purposes of verifying the additional data, wherein the step of verifying the additional data without transmitting a new request for a verification object is performed based on a result of the determination that at least one of the first executable code included in the verification object, the second executable code, the combination of part of the first executable code included in the verification object and the second executable code, and the combination of both the first executable code included in the verification object and the second executable code is suitable for purposes of verifying the additional data.

* * * * *

UNITED STATES PATENT AND TRADEMARK OFFICE
CERTIFICATE OF CORRECTION

PATENT NO.      : 6,466,947 B2                                           Page 1 of 1
DATED           : October 15, 2002
INVENTOR(S)     : Kenneth C.R.C. Arnold et al.

It is certified that error appears in the above-identified patent and that said Letters Patent is hereby corrected as shown below:

Column 13,
Line 30, "a least" should read -- at least --;
Line 50, before "further" delete ", the";
Line 54, "on the a" should read -- on a --;

Column 14,
Line 24, "on of" should read -- one of --;
Line 50, after "wherein" insert -- the --;
Line 54, after "exists" insert -- to --;

Column 15,
Line 29, "on the a" should read -- on a --;

Column 16,
Line 48, "additional data is preformed on a result of a result of" should read -- based on a result of --;

Column 17,
Line 6, after "code" insert -- , and, based on a result of this determination, obtaining the first executable code --; and Column 18,
Line 1, "least on" should read -- least one --.

Signed and Sealed this

Twenty-fifth Day of November, 2003

JAMES E. ROGAN
*Director of the United States Patent and Trademark Office*